(12) United States Patent
Watarai

(10) Patent No.: US 8,696,069 B2
(45) Date of Patent: Apr. 15, 2014

(54) BICYCLE RIM

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 295 days.

(21) Appl. No.: 13/032,763

(22) Filed: Feb. 23, 2011

(65) Prior Publication Data

US 2012/0212038 A1  Aug. 23, 2012

(51) Int. Cl.
*B60B 21/06* (2006.01)

(52) U.S. Cl.
USPC .................................... 301/95.101

(58) Field of Classification Search
USPC .................... 301/55, 58, 61, 104
See application file for complete search history.

(56) References Cited

U.S. PATENT DOCUMENTS

| | | | |
|---|---|---|---|
| 5,931,544 A * | 8/1999 | Dietrich | 301/58 |
| 6,186,598 B1 * | 2/2001 | Chen | 301/58 |
| 6,536,849 B1 | 3/2003 | Okajima et al. | |
| 6,715,844 B2 | 4/2004 | Dietrich | |
| 7,029,074 B2 | 4/2006 | Chen | |
| 7,178,239 B2 * | 2/2007 | Meggiolan et al. | 29/894.342 |
| 7,192,098 B2 * | 3/2007 | Okajima | 301/58 |
| 7,290,839 B2 * | 11/2007 | Okajima | 301/95.107 |
| 7,866,045 B2 * | 1/2011 | Meggiolan et al. | 29/894.342 |
| 2007/0158996 A1 | 7/2007 | Meggiolan et al. | |
| 2008/0048489 A1 * | 2/2008 | Liu | 301/61 |

FOREIGN PATENT DOCUMENTS

| | | |
|---|---|---|
| DE | 913967 | 12/1962 |
| DE | 20 2004 007 803 U1 | 8/2004 |
| FR | 2 825 319 A1 | 12/2002 |
| NL | 7 906 928 A | 3/1981 |
| WO | WO 2005/072989 A1 | 8/2005 |

OTHER PUBLICATIONS

U.S. Appl. No. 13/026,492, filed Feb. 14, 2011, Kuan et al.
European Search Report of corresponding EP Application No. 11 18 4268.8 dated Apr. 2, 2012.

* cited by examiner

*Primary Examiner* — S. Joseph Morano
*Assistant Examiner* — Jean Charleston
(74) *Attorney, Agent, or Firm* — Global IP Counselors

(57) ABSTRACT

A bicycle rim is provided with an annular tire mounting part, an annular spoke mounting part and a plurality of spoke attachment member. The annular spoke mounting part includes a plurality of spoke openings disposed at predetermined locations along a circumferential direction of the annular spoke mounting part with a predetermined circumferential spacing between adjacent centers of the spoke openings. The spoke attachment members are tethered together by at least one tethering member such that adjacent ones of the spoke attachment members are retained by the at least one tethering member with a predetermined maximum distance between adjacent ones of the spoke attachment members, the predetermined maximum distance corresponding to the predetermined circumferential spacing between the adjacent centers of the spoke openings.

15 Claims, 8 Drawing Sheets

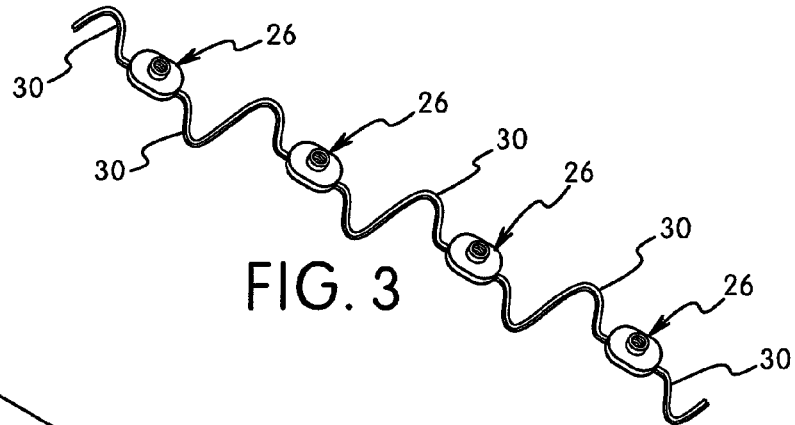
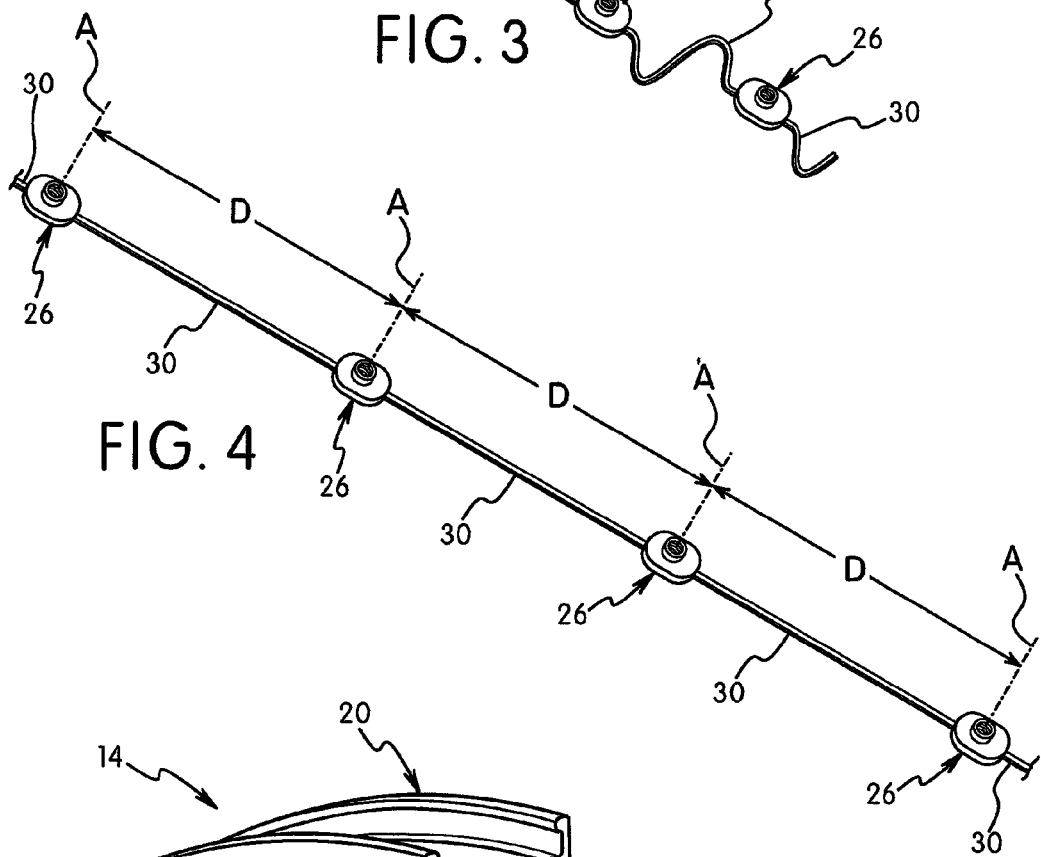
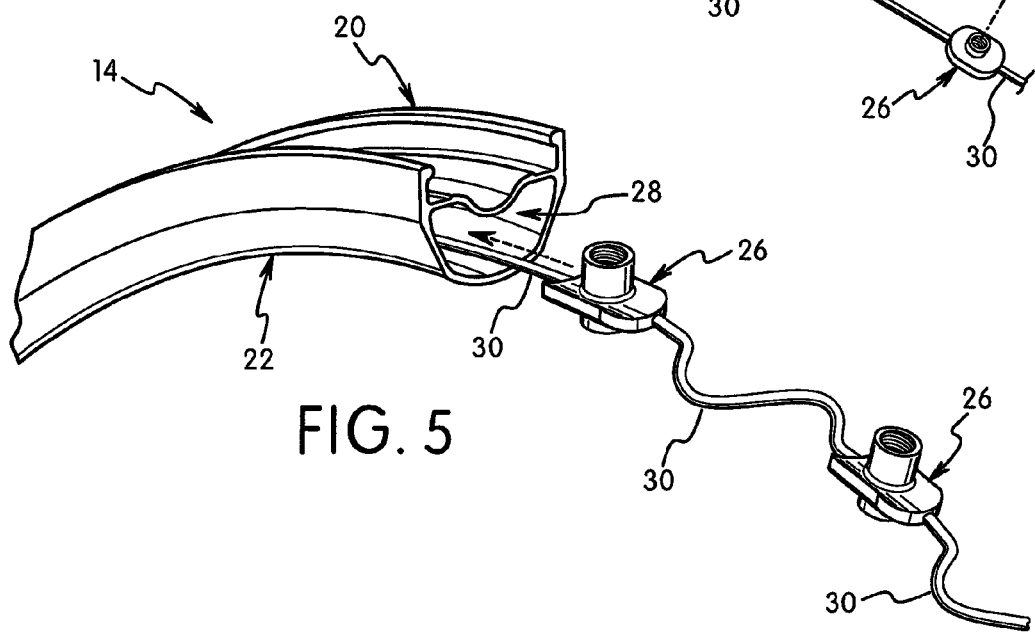

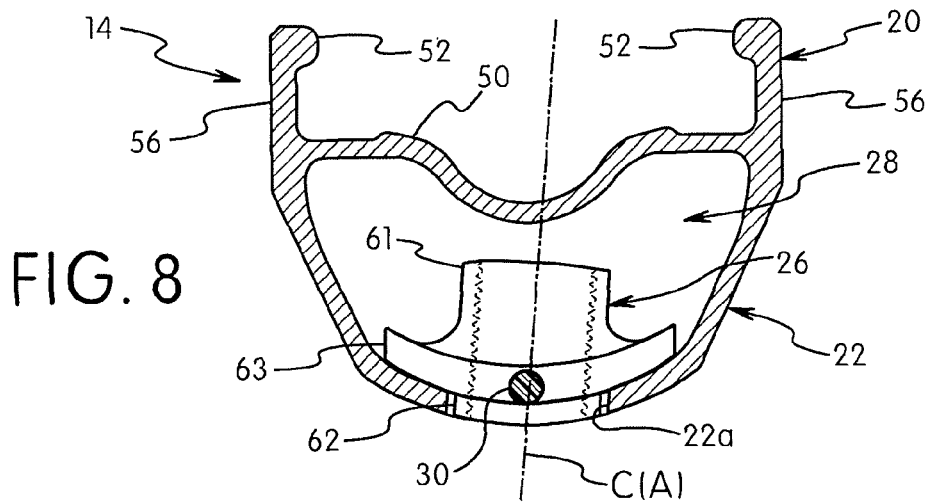
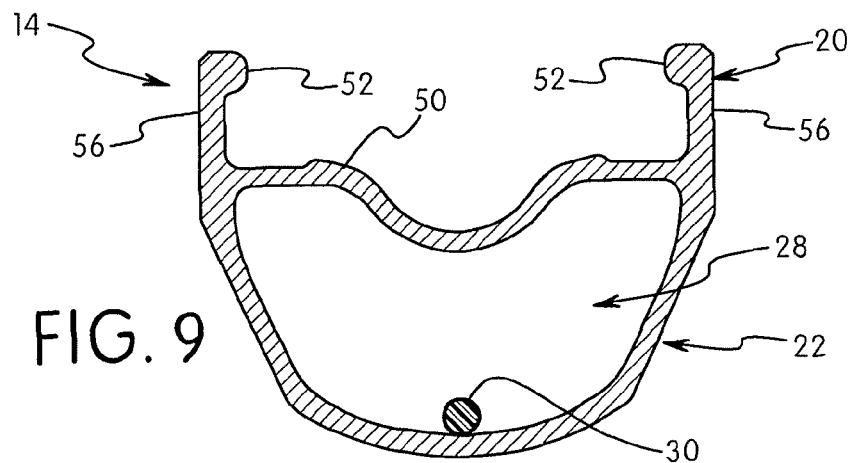
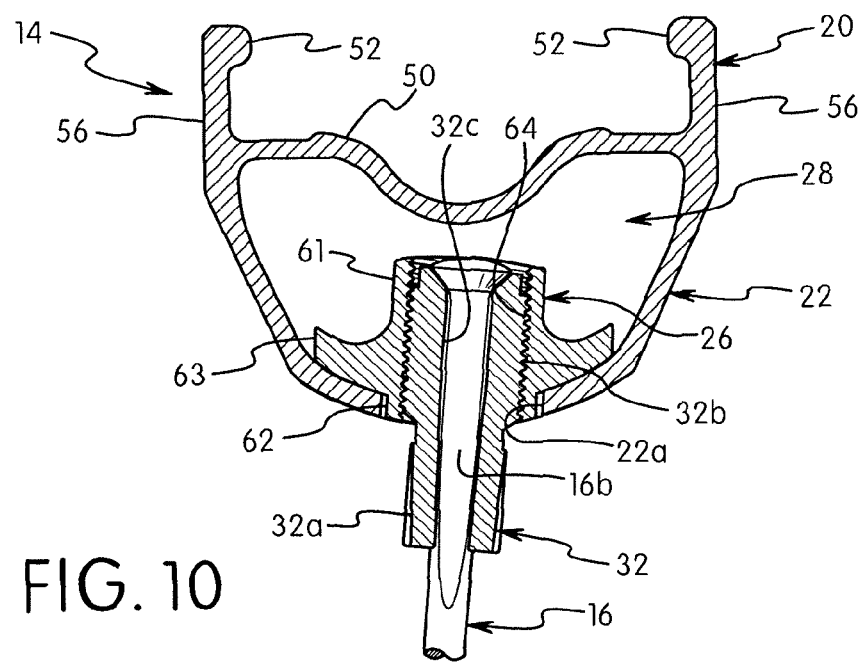

BICYCLE RIM

BACKGROUND

1. Field of the Invention

This invention generally relates to a bicycle rim. More specifically, the present invention relates to a bicycle rim for tensioned spokes.

2. Background Information

Bicycle wheels are continually undergoing design modifications to make them easier to manufacture and assemble, as well as stronger, lighter and more aerodynamic. Various types of bicycle wheels are being sold on the market at present. Many bicycle wheels include a hub, a plurality of spokes and an annular rim. The hub is rotatably mounted to a part of the bicycle frame. The inner end of each spoke is connected to the hub and the spokes extend outward from the hub. The annular rim is connected to the outer ends of the spokes and includes an outer circumferential part that supports a pneumatic tire.

In general, the spokes of a bicycle wheel are thin wire spokes. A flange that connects the spokes to the hub is normally formed at both ends of the hub. Specifically, for example, holes are formed in the hub flanges for receiving the inner ends of the spokes. The interior end of each spoke is supported in a hole formed in one hub flange. In general, the outer end of each spoke is threaded such that the outer end can engage with a spoke nipple that secures the outer end of the wire spoke to the rim hole. In order to make the bicycle wheel as lightweight as possible, the rim is usually made of aluminum alloy, and is sought to be made as thin as possible. However, making the rim thin results in a reduction in strength, particularly in the relatively high-stress areas around each spoke hole. Thus, aluminum rims are often reinforced with either single eyelets or double eyelets to distribute the stress of the spoke. A single eyelet reinforces the spoke hole much like a hollow rivet. A double eyelet is a cup that is riveted into both walls of a double-walled rim.

SUMMARY

One aspect is to provide a bicycle rim cost that is relatively inexpensive and simple to manufacture.

In view of the state of the known technology, a bicycle rim is provided that basically comprises an annular tire mounting part, an annular spoke mounting part and a plurality of spoke attachment member. The annular spoke mounting part includes a plurality of spoke openings disposed at predetermined locations along a circumferential direction of the annular spoke mounting part with a predetermined circumferential spacing between adjacent centers of the spoke openings. The spoke attachment members are tethered together by at least one tethering member such that adjacent ones of the spoke attachment members are retained by the at least one tethering member with a predetermined maximum distance between adjacent ones of the spoke attachment members, the predetermined maximum distance corresponding to the predetermined circumferential spacing between the adjacent centers of the spoke openings.

These and other objects, features, aspects and advantages of the bicycle rim will become apparent to those skilled in the art from the following detailed description, which, taken in conjunction with the annexed drawings, discloses illustrated embodiments.

BRIEF DESCRIPTION OF THE DRAWINGS

Referring now to the attached drawings which form a part of this original disclosure:

FIG. 3 is a partial perspective view of four of the spoke attachment members of the bicycle rim illustrated in FIGS. 1 and 2 that are tether connected together by tethering members with the tethering members being in an non-stretched state;

FIG. 4 is a partial perspective view of the four of the spoke attachment members illustrated in FIG. 3 with the tethering members being in a stretched state;

FIG. 5 is a perspective view of the spoke attachment members illustrated in FIGS. 3 and 4 being inserted into the interior space of the rim;

FIG. 8 is an enlarged transverse cross-sectional view of a portion of the bicycle rim illustrated in FIGS. 1, 2 and 5 to 7 after the spoke attachment members have been aligned and located in the spoke openings of the rim;

FIG. 9 is an enlarged transverse cross-sectional view of the portion of the bicycle rim illustrated in FIGS. 1, 2 and 5 to 7, as seen along a section line at a midway point between the spoke attachment members;

FIG. 10 is an enlarged spoke cross-sectional view of the portion of the bicycle rim illustrated in FIG. 2, with the spoke attachment member disposed in the spoke openings and one of the spokes attached to the spoke attachment member by a spoke nipple;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
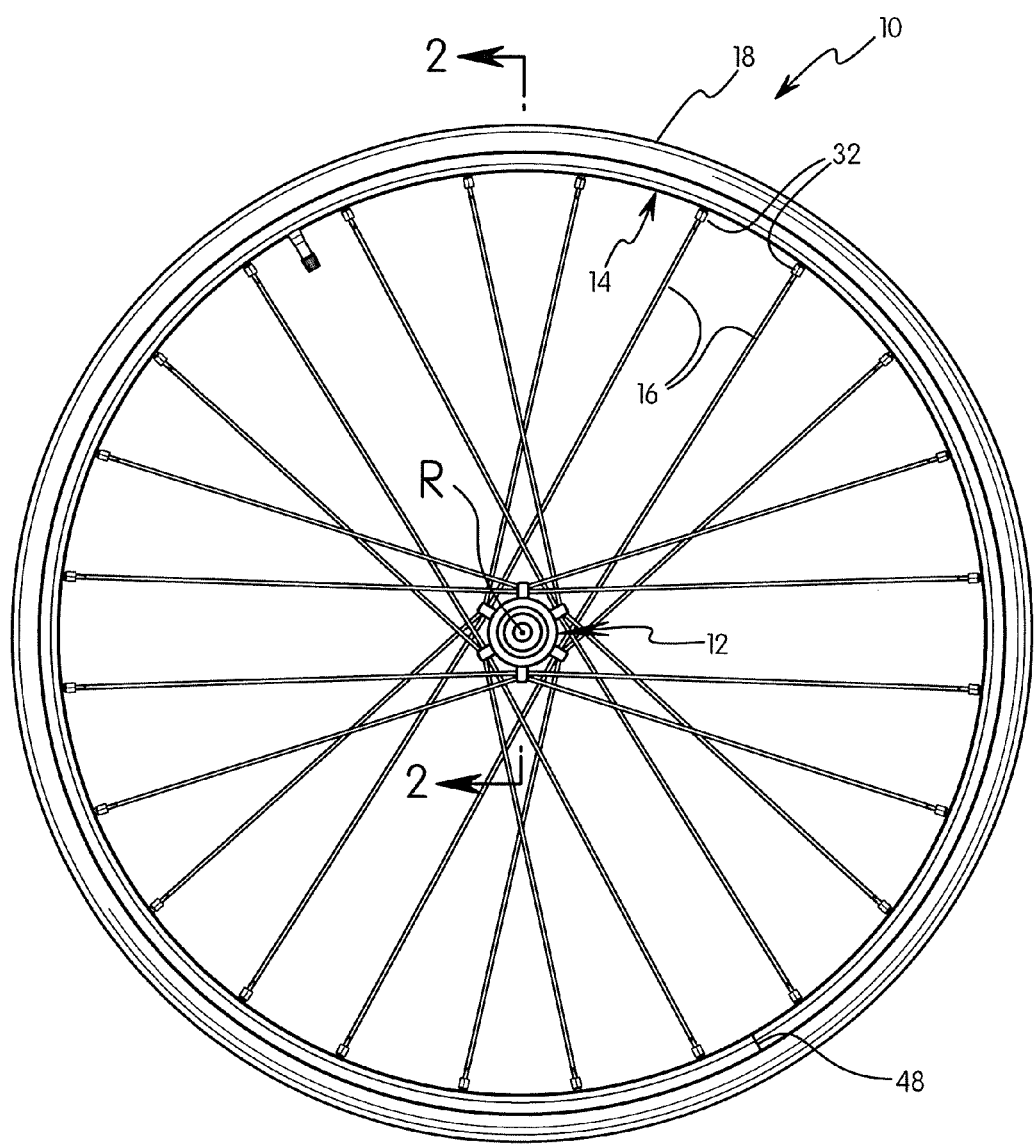
FIG. 1 is a side elevational view of a bicycle wheel that includes a bicycle rim with a plurality of spoke attachment members in accordance with a first illustrated embodiment.
Figure 2:
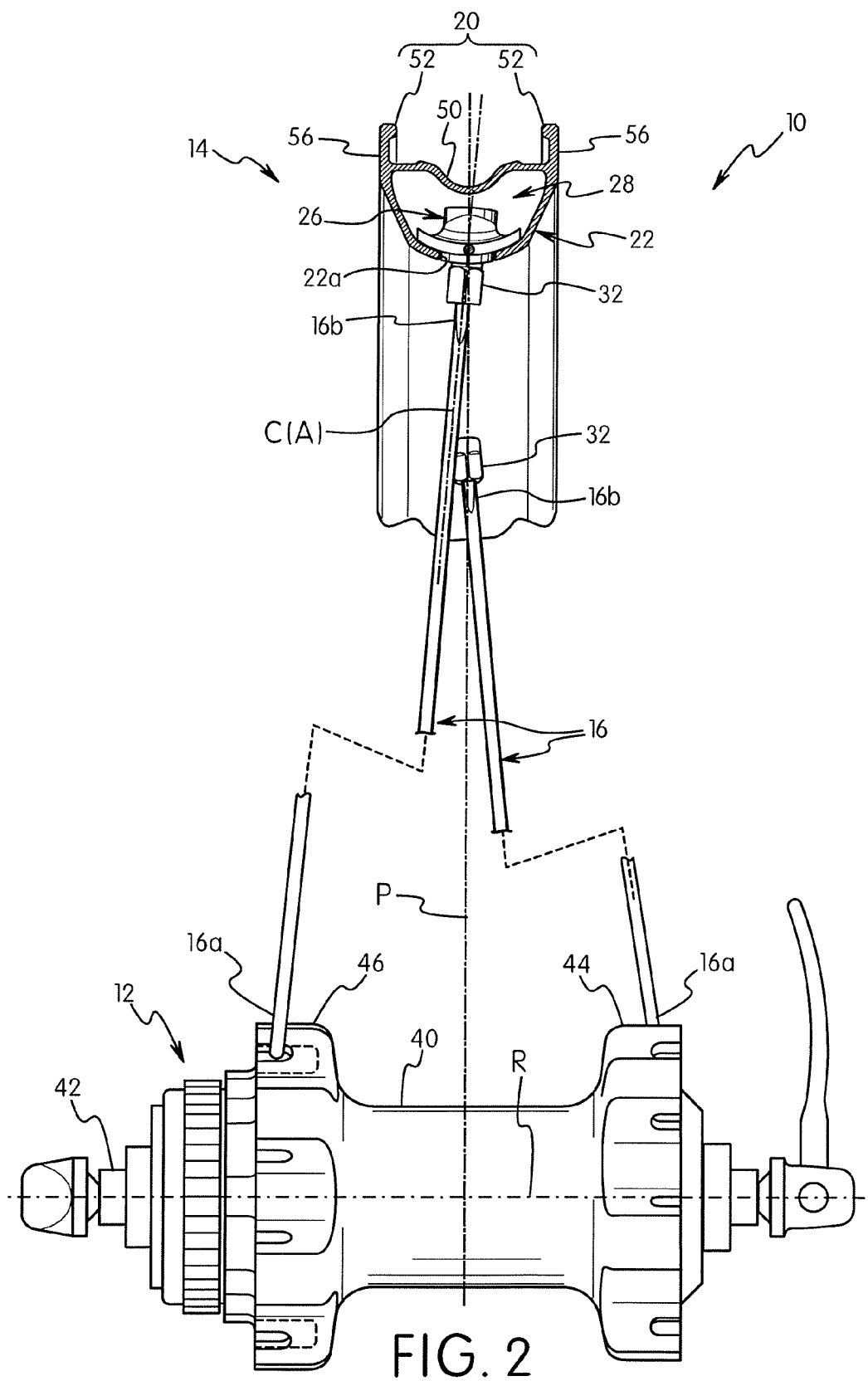
FIG. 2 is an enlarged transverse cross sectional view of a portion of the front wheel illustrated in FIG. 1 as seen along section line 2-2 in FIG. 1.

Referring initially to FIGS. 1 and 2, a tensioned spoke bicycle wheel 10 is illustrated in accordance with a first illustrated embodiment. The bicycle wheel 10 basically includes a center hub 12, a bicycle rim 14, a plurality of spokes 16 and a pneumatic tire 18. The hub 12 is connected to the rim 14 by the spokes 16, which are placed under tension. The tire 18 is attached to the outer periphery of the rim 14. Thus, the bicycle wheel 10 rotates about a center rotational axis R of the hub 12. The hub 12, the spokes 16 and the tire 18 are conventional parts, and thus, the hub 12, the spokes 16 and the tire 18 will only be briefly explained herein. The bicycle wheel 10 is a clincher tire wheel in which that an air tight chamber is formed between the outer surface of the rim 14 and the pneumatic tire 18. Of course, it will be apparent to those skilled in the art from this disclosure that the rim 14 can be adapted to a tubeless tire wheel as needed and/or desired.

Referring now to FIGS. 2 to 9, the rim 14 and its connection to the spokes will now be discussed in more detail. As seen in FIGS. 2 and 7 to 9, the rim 14 basically includes an annular tire mounting part 20, an annular spoke mounting part 22 and a plurality of spoke attachment members 26. In the first illustrated embodiment, the annular tire mounting part 20 and the annular spoke mounting part 22 are formed as a one-piece, unitary member from as suitable metal such as an aluminum alloy. The spoke mounting part 22 extends from the annular tire mounting part 20 to define an interior space 28 with a predetermined interior shape. Each of the annular tire mounting part 20 and the annular spoke mounting part 22 has a single air valve mounting opening (not shown) for attaching an air valve to the annular tire mounting part 20 and the annular spoke mounting part 22 in a conventional manner.

Figure 6:
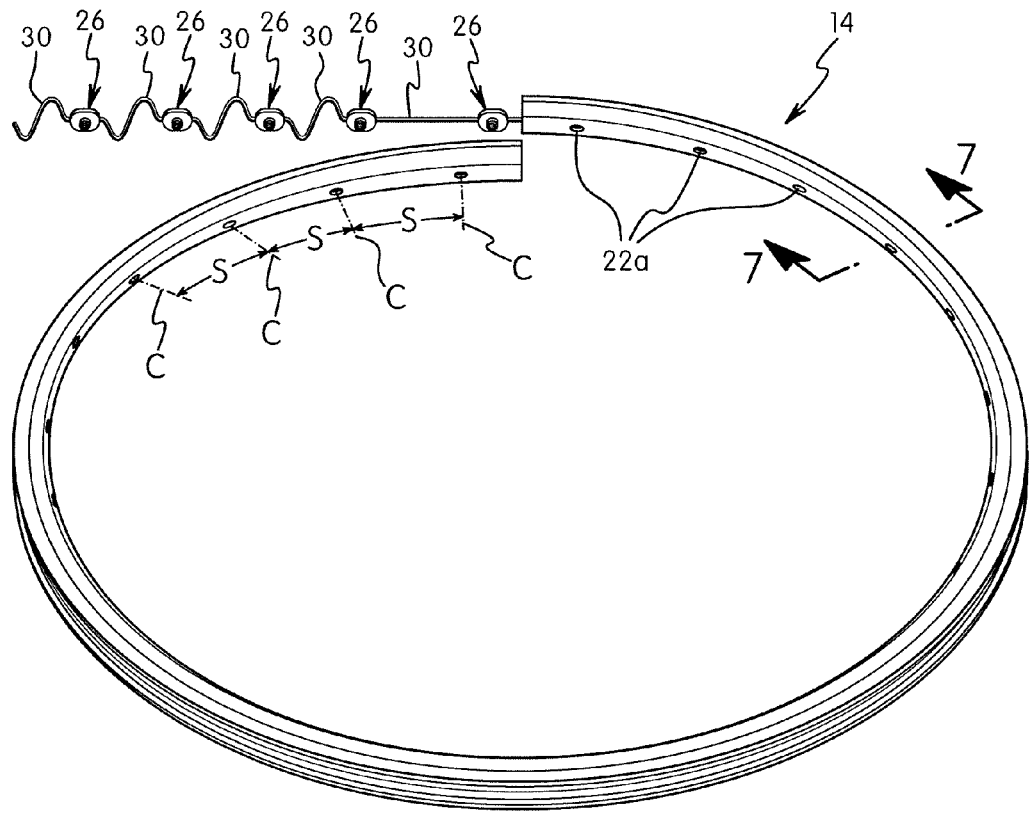
FIG. 6 is a perspective view of the rim with some of the spoke attachment members having been inserted into the interior space of the rim.

As best seen in FIG. 6, the annular spoke mounting part 22 has a plurality of spoke openings 22a that corresponds to the number of the spokes 16. The spoke openings 22a are disposed at predetermined locations along a circumferential direction of the annular spoke mounting part 22 with a predetermined circumferential spacing S between adjacent centers C of the spoke openings 22a. The spoke attachment members 26 are located disposed in the interior space 28 with a respective one of the spoke attachment members 26 disposed in a corresponding one of the spoke openings 22a.

As seen in FIG. 2, in the first illustrated embodiment, the spoke attachment members 26 are disposed in the interior space 28 and used to attach the spokes 16 to the rim 14. The spoke attachment members 26 constitute reinforcement members for the rim 14 at each of the spoke attachment points of the rim 14. As explained below, each the spoke attachment members 26 has a spoke attachment axis A that corresponds to an axis of the spoke 16 that is attached thereto. All of the spoke attachment members 26 are preferably identical. However, the shapes of the spoke attachment members 26 can vary among the spoke attachment members 26 as need and/or desired.

As seen in FIGS. 3 to 6, in the first illustrated embodiment, the spoke attachment members 26 are tethered together by a plurality of tethering members 30 to form a linked spoke attachment arrangement. Preferably, the linked spoke attachment arrangement includes a predetermined number of the spoke attachment members 26 that corresponds to the number of the spoke openings 22a of the rim 14. However, two or more linked spoke attachment arrangements can be used with the rim 14. For example, two linked spoke attachment arrangements with twelve spoke attachment members each can be used with the rim 14 in the first illustrated embodiment.

The tethering members 30 are bonded or fixed to adjacent ones of the spoke attachment members 26 such that the adjacent ones of the spoke attachment members 26 are retained by the tethering members 30 at a predetermined maximum distance D apart as measured between adjacent spoke attachment axes A of the spoke attachment members 26. In other words, the spoke attachment members 26 are arranged with respect to the tethering members 30 such that the adjacent ones of the spoke attachment members 26 are retained by the tethering members 30 at the predetermined maximum distance D therebetween. The predetermined maximum distance D corresponds to the predetermined circumferential spacing S between the adjacent centers C of the spoke openings 22a. In any event, the spoke attachment members 26 are spaced apart by the tethering members 30 such that the spoke attachment members 26 align with the spoke openings 22a for attaching the spokes 16 to the spoke attachment members 26 through the spoke openings 22a. In the illustrated spoking arrangement, the predetermined maximum distances D between the adjacent ones of the spoke attachment members are equal.

Alternatively, instead of using a plurality of tethering members, a single continuous tethering member can be used. In such an alternative case, the single continuous tethering member passes thorough the spoke attachment members 26. In this alternative case, the spoke attachment members 26 can be molded on the single continuous tethering member to attach the spoke attachment members 26 at the predetermined maximum distances D therebetween.

In the first illustrated embodiment, the spoke attachment members 26 are individual, separate members that are connected together and aligned with the spoke openings 22a by the tethering members 30. In the first illustrated embodiment, the tethering members 30 are either metallic or non-metallic cords that are made of formed of a material that is flexible, non-resilient and non-self supporting. For example, each of the tethering members 30 is formed of a metallic wire, a plastic string, a woven fiber string, an elongated piece of cloth or similar elongated materials. Preferably, all of the tethering members 30 are the same material. However, the tethering members 30 can be made of a combination of materials such that some or all of the tethering members 30 are different.

In the first illustrated embodiment, the spoke attachment member 26 is a one-piece, unitary member formed of a hard rigid material such as a metal material such as aluminum, or a fiber reinforced plastic (FRP), or a resin with carbon fibers. The spoke attachment members 26 are firmly held against an interior surface of the annular spoke mounting part 22 by the tension of the spokes 16. As explained in more detail below, the spokes 16 are each adjustably to one of the spoke attachment members 26 by a spoke nipple 32 that is threaded into one of the spoke attachment members 26. The combination of the spoke attachment member 26 and the spoke nipple 32 constitutes a spoke attachment structure that has a spoke tension adjustment feature.

The spokes 16 will now be explained with reference to FIGS. 1 and 2. The spokes 16 are all preferably identical to each other. The spokes 16 are preferably integrally formed as a one-piece, unitary single member (integral member) using conventional manufacturing techniques. In the embodiment illustrated, the spokes 16 are radial spokes that connect the hub 12 to the rim 14. The spokes 16 are aligned along a circumferential direction at equal intervals along the rim 14. Each spoke 16 basically includes an inner end 16a and an outer end 16b. Each of the outer ends 16b of the spokes 16 has a flange or enlarged part for engaging one of the spoke nipples 32. In the embodiment illustrated, a total of twenty-four tangential spokes 16 are used. Naturally, it will be apparent to those skilled in the bicycle field from this disclosure that the bicycle wheel 10 can have fewer or more spokes and/or a different spoking arrangement (e.g., all radial spokes, or a combination of tangential spokes and radial spokes).

Still referring to FIGS. 1 and 2, the hub 12 will now be briefly explained. The hub 12 is a relatively conventional hub, which basically includes a cylindrical hub shell 40 rotatably supported on a hub axle 42 by a pair of bearings (not shown). The hub axle 42 defines the center rotational axis R of the bicycle wheel 10 and the rim 14. As seen in FIG. 2, the hub 12 has two spoke attachment portions 44 and 46 for attaching the spokes 16. In particular, each of the attachment portions 44 and 46 has six spoke mounting lugs with each lug having two spoke mounting openings for attaching the spokes 16. In the embodiment illustrated, the attachment portions 44 and 46 are mirror images of each other, but with the spoke mounting lugs being circumferentially offset. In other words, the spoke mounting points of the attachment portion 44 are offset in the circumferential direction from the spoke mounting points of the attachment portion 46. In the embodiment illustrated, the hub 12 is a front bicycle hub. However, it will be apparent to those skilled in the bicycle field from this disclosure that the hub 12 can be replaced with a rear hub, as needed and/or desired.

Referring now to FIGS. 1, 2 and 7 to 9, the bicycle rim 14 will now be explained in more detail. The rim 14 is essentially a circular metal member that is attached to the outer ends 16b of the spokes 16 by the spoke nipples 32 in a conventional manner. The tire 18 is attached to the outer periphery of the rim 14 in a conventional manner. In this first illustrated embodiment, the rim 14 is a metal rim formed of a suitable metallic material such as an aluminum alloy. Of course, it will be apparent to those skilled in the art from this disclosure that the rim 14 can be formed of a fiber reinforced plastic (FRP) or a resin with carbon fibers as needed and/or desired.

In the first illustrated embodiment, the rim 14 can be formed by extruding metal into a metal tube with a desired uniform cross sectional profile suitable for the rim 14. The metal tube or hoop is then cut to the desired length and bent into a hoop member. The spoke attachment members 26 are inserted into the metal tube. Finally, the first and second ends of the hoop member are joined together to define a rim joint part 48 (FIG. 1). The cross sectional profile of the rim 14 can have a wide range of geometry, which can be optimized for particular performance goals as needed and/or desired. Aerodynamics, mass and inertia, stiffness, durability, tubeless tire compatibility, brake compatibility, and cost are all considerations in the cross sectional profile of the rim 14.

Figure 7:
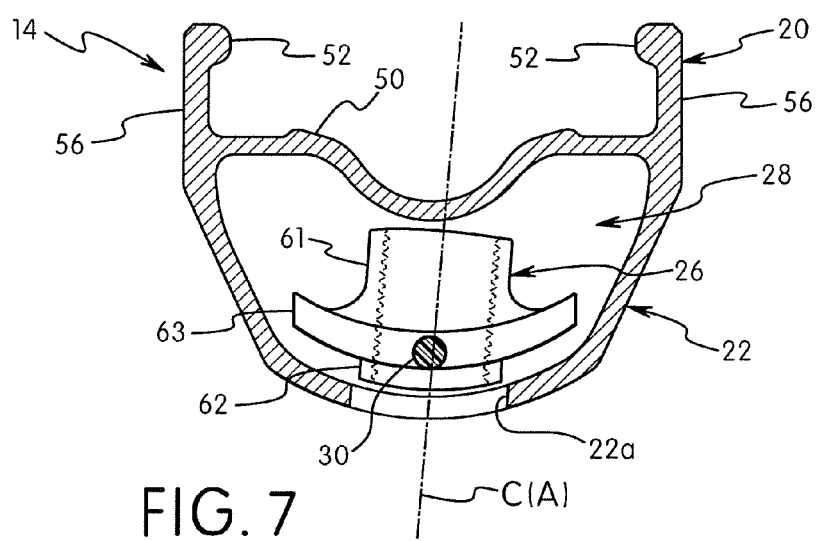
FIG. 7 is an enlarged transverse cross-sectional view of a portion of the bicycle rim as seen along section line 7-7 in FIG. 6.

As seen in FIGS. 7 to 9, in this illustrated embodiment, the annular tire mounting part 20 and the annular spoke mounting part 22 are integrally formed as a one-piece, unitary hoop member with a uniform cross sectional profile, except for where has been removed material (e.g., at the air valve mounting openings and the spoke openings 22a). The annular tire mounting part 20 of the bicycle rim 14 includes an annular outer bridge 50 and a pair of bead hooks or bead flanges 52. The annular outer bridge 50 is free of any openings communicating with the interior space except for a single air valve mounting opening (not shown), which is used to mount an air valve in a conventional manner. The annular spoke mounting part 22 extends from the annular tire mounting part 20 to define the interior space 28 with a predetermined interior shape.

As best seen in FIG. 6, the spoke openings 22a are disposed at predetermined locations along a circumferential direction of the annular spoke mounting part 22. While the annular spoke mounting part 22 of the rim 14 is provided with twenty-four of the spoke openings 22a, the annular spoke mounting part 22 can have fewer or more of the spoke openings 22a as needed and/or desired. The spoke openings 22a in the annular spoke mounting part 22 are angled so that their center axes form acute angles with respect to a center plane P of the rim 14, which extends perpendicularly from the center rotational axis R of the bicycle wheel 10 and bisects the rim 14 into two halves. In particular, the spoke openings 22a are angled with respect to the center plane P by about five to six degrees in an alternating manner. In particular, the angles of the spoke openings 22a are arranged so that the center axes of the spoke openings 22a alternate in opposite directions relative to the center plane P of the rim 14. In other words, every other one of the spoke openings 22a have their center axes tilted to a first side of the center plane P, and the other the spoke openings 22a have their center axes tilted to a second side of the center plane P. Also while the spoke openings 22a are all circular openings, theses openings can have other shapes as needed and/or desired.

The bead flanges 52 and the sides of the annular spoke mounting part 22 are surface treated (e.g., subjected to a grinding process) to form a pair of flat brake contact surfaces 56. The brake contact surfaces 56 are disposed both inward and outward of the outer bridge 50 (i.e., extending across the outer bridge 50) in a radial direction with respect to the center rotational axis R of the rim 14. The brake contact surfaces 56 are continuous flat surfaces. The brake contact surfaces 56 are typically formed by grinding the sides of the rim 14 after butt welding the ends of the rim 14 together to form a hoop. The grinding of the sides of the rim 14 to form the brake contact surfaces 56 are beneficial in that any roughness produced due to the butt welding procedure can be removed from the brake contact surfaces 56.

Referring to FIGS. 7 to 9, the spoke attachment members 26 (only one shown) are slidably disposed within the interior space 28 to move in a circumferential direction of the rim 14. However, as discussed below, the spoke attachment members 26 are maintained in an upright position so that they will easy fall into a corresponding one of the spoke openings 22a. Generally speaking, the overall shapes of the spoke attachment members 26 together with the interior configuration of the interior space 28 constitute an orientation maintaining arrangement. In other words, the orientation maintaining arrangement is a mating configuration between the spoke attachment members 26 and the interior configuration of the interior space 28 that prevents the spoke attachment members 26 from tipping over within the interior space 28. The spoke attachment members 26 are dimensioned such that the spoke attachment members 26 are larger than the spoke openings 22a. Thus, the spoke attachment members 26 cannot pass through the spoke openings 22a.

In the first illustrated embodiment, each of the spoke attachment members 26 includes a first or outer tubular portion 61, a second or inner tubular portion 62 and an orientation maintaining flange 63. A threaded bore or hole 64 extends through the first and second tubular portions 61 and 62 and the orientation maintaining flange 63 of the spoke attachment member 26. The threaded bore 64 constitutes the spoke receiving part or hole of the spoke attachment member 26, with the center axis corresponding to the spoke attachment axis A of the spoke attachment member 26. The second tubular portion 62 of the spoke attachment member 26 constitutes a projection that is dimensioned to be received in the one of the spoke openings 22a. The orientation maintaining flange 63 has a curved rim contact surface that mates with the curvatures of the surface of the annular spoke mounting part 22 while the second tubular portion 62 is disposed in one of the spoke openings 22a. However, the spoke attachment members 26 are not limited to this configuration. For example, the spoke attachment members 26 can have an unthreaded bore if needed and/or desired.

Referring to FIG. 10, the threaded bore 64 of the first and second tubular portions 61 and 62 has an internal thread that receives the spoke nipple 32 for securing the outer end 16b of the spoke 16 to the rim 14. In particular, the spoke nipple 32 has a tool engagement portion 32a and a threaded portion 32b with a spoke receiving bore 32c. The tool engagement portion 32a has a hexagonal exterior surface as viewed along the spoke receiving bore 32c of the spoke nipple 32. The threaded portion 32b has an external thread that is engaged with the internal thread of the threaded bore 64 to adjustably secure the spoke nipple 32 to the spoke attachment member 26. By turning the spoke nipple 32 on the spoke 16, the spoke nipple 32 moves axially with respect to the threaded bore 64 of the spoke attachment member 26 to adjust the tension in the spoke 16.

Figure 11:
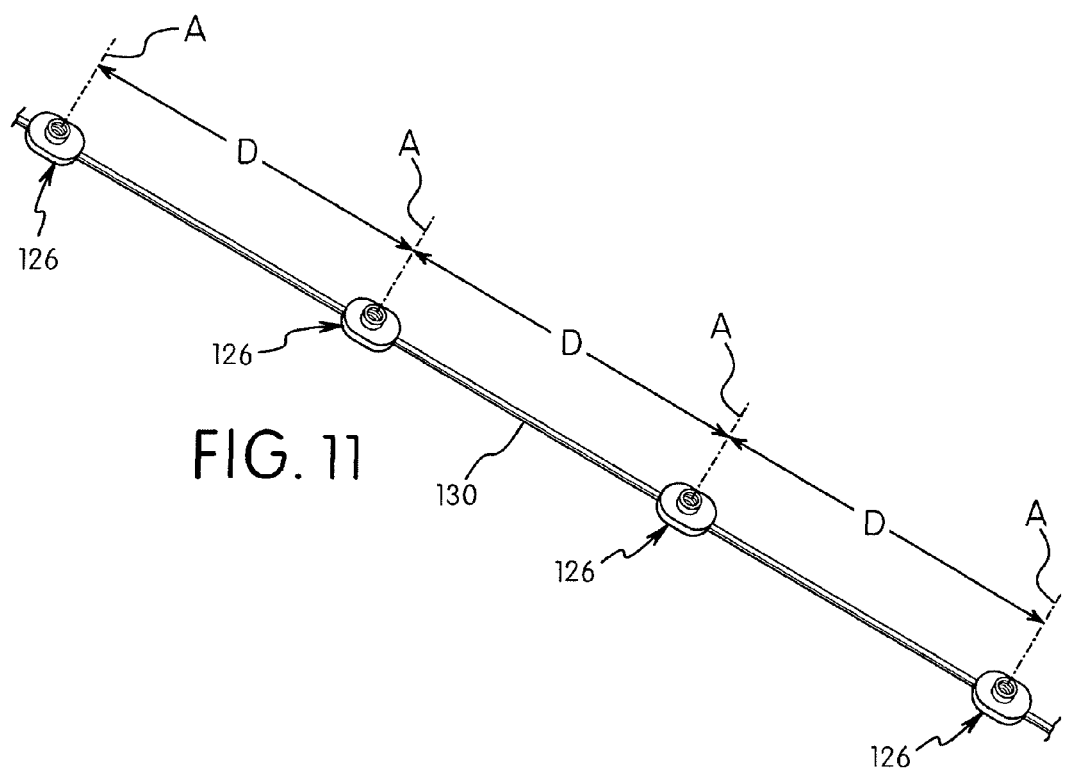
FIG. 11 is a partial perspective view of four of the spoke attachment members that are tether connected together by tethering members in the form of a single resilient wire in accordance with a second embodiment.
Figure 12:
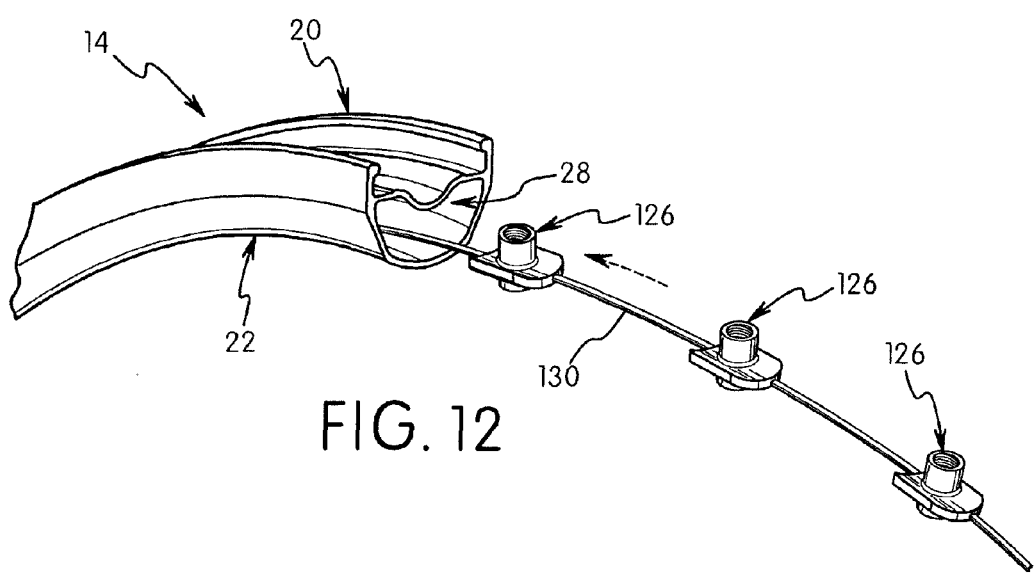
FIG. 12 is a perspective view of the spoke attachment members illustrated in FIG. 11 being inserted into the interior space of the rim.

Referring to now to FIGS. 11 and 12, a linked spoke attachment arrangement is illustrated for use with the rim 14 in accordance with a second illustrated embodiment. Here, the linked spoke attachment arrangement includes a plurality of spoke attachment members 126 and a single one-piece tethering member 130. The spoke attachment members 126 are identical in shape to the spoke attachment members 26 as discussed above. However, the spoke attachment members 126 are molded on the tethering member 130. The spoke attachment members 126 are molded on the tethering member 130 such that the tethering member 130 does not extend into the spoke receiving holes of the spoke attachment members 126. Of course, as in the first embodiment, a plurality of the tethering member 130 can be used to tether the spoke attachment members 126 together.

Preferably, in this second embodiment, the linked spoke attachment arrangement includes a predetermined number of the spoke attachment members 126 that corresponds to the number of the spoke openings 22a of the rim 14. However, two or more linked spoke attachment arrangements can be used with the rim 14 as explained in some of the other illustrated embodiment.

The tethering member 130 includes a resilient metallic wire that is self supporting such that the spoke attachment members 126 can be pushed circumferentially within the interior space 28 without the tethering member 130 collapsing. Alternatively, the tethering member 130 can be a normally curved wire with a curvature that matches or substantially matches the curvature of the rim 14. In either case, the tethering member 130 preferably includes a resilient wire that at most elastically deforms (i.e., does not plastically deform) during installation of the linked spoke attachment arrangement into the interior space 28.

Figure 13:
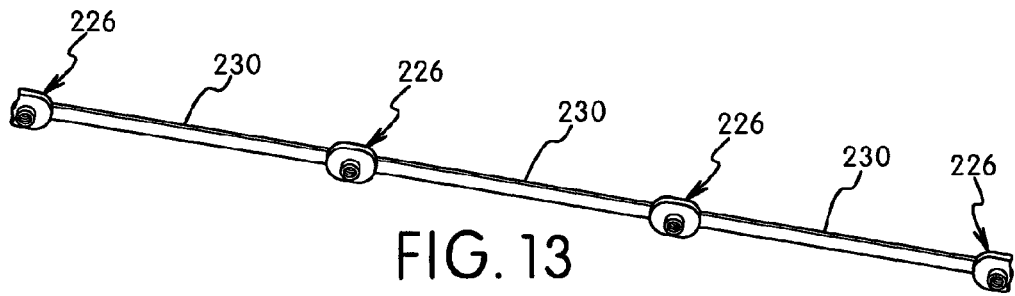
FIG. 13 is a partial perspective view of four of the spoke attachment members that are tether connected together by tethering members in the form of narrow plates in accordance with a third embodiment.
Figure 14:
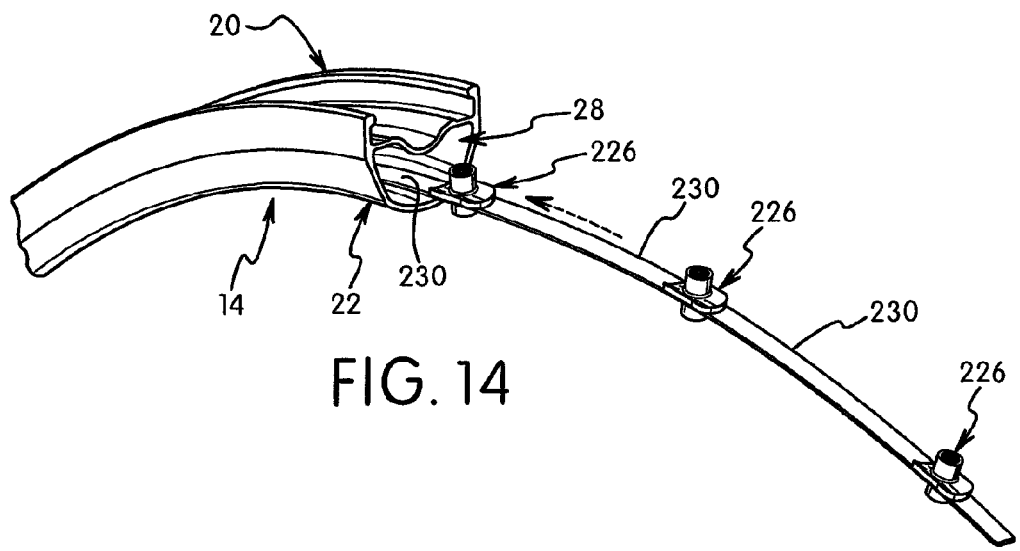
FIG. 14 is a perspective view of the spoke attachment members illustrated in FIG. 13 being inserted into the interior space of the rim.
Figure 15:
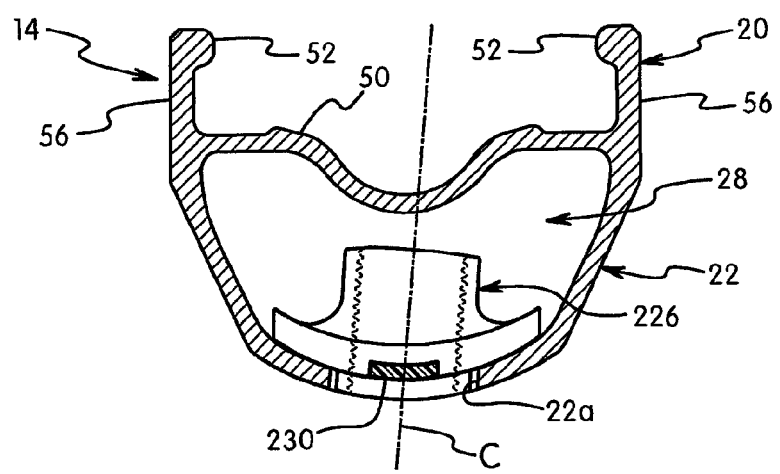
FIG. 15 is an enlarged transverse cross-sectional view of a portion of the bicycle rim as seen along a section line in at the center of one of the spoke openings of the rim after the spoke attachment members have been aligned and located in the spoke openings of the rim using the narrow plates illustrated in FIGS. 13 and 14 as a tethering members.

Referring to now to FIGS. 13 to 15, a linked spoke attachment arrangement is illustrated for use with the rim 14 in accordance with a third illustrated embodiment. Here, the linked spoke attachment arrangement includes a plurality of spoke attachment members 226 and a plurality of tethering members 230. The spoke attachment members 226 are identical to the spoke attachment members 26 as discussed above except that the spoke attachment members 226 are tethered together by the tethering members 230.

Preferably, in this third embodiment, the linked spoke attachment arrangement includes a predetermined number of the spoke attachment members 226 that corresponds to the number of the spoke openings 22a of the rim 14. However, two or more linked spoke attachment arrangements can be used with the rim 14 as explained in some of the other illustrated embodiment. For example, in this third embodiment, three linked spoke attachment arrangements, each having eight of the spoke attachment members 226, can be used with the rim 14 in the first illustrated embodiment.

The tethering members 230 are formed of a material that is self supporting such that the spoke attachment members 226 can be pushed circumferentially within the interior space 28 of the rim 14 without the tethering members 230 collapsing. Each tethering member 230 is a narrow plate that is configured to prevent twisting (torsional movement) about its longitudinal dimension during installation. Each of the tethering members 230 can be a normally flat plate with sufficient resiliency to elastically bend to form an arc that matches the curvature of the rim 14. Alternatively, each of the tethering members 230 can be a normally curved plate with a curvature that matches or substantially matches the curvature of the rim 14. In either case, each of the tethering members 230 preferably includes a resilient plate that at most elastically deforms (i.e., does not plastically deform) during installation of the linked spoke attachment arrangement into the interior space 28.

In accordance this third illustrated embodiment, the tethering member 230 has a narrower lateral width than a lateral width of the interior space 28 in a direction parallel to the center rotational axis R of the rim 14. From the standpoint of minimizing the weight of the bicycle wheel, it is preferably to have the lateral widths of the tethering members 230 as small as possible without compromising the ability of the spoke attachment members 226 to be pushed circumferentially within the interior space 28 of the rim 14 without the tethering members 230 collapsing. However, if the lateral widths of the tethering members 230 are too small, then the tethering members 230 may twist and/or bend laterally during installation of the linked spoke attachment arrangement into the interior space 28 of the rim 14. To avoid, such twisting and/or laterally bending of the tethering members 230 during installation, the interior space 28 of the rim 14 can be provided with a guiding structure as needed and/or desired.

Figure 16:
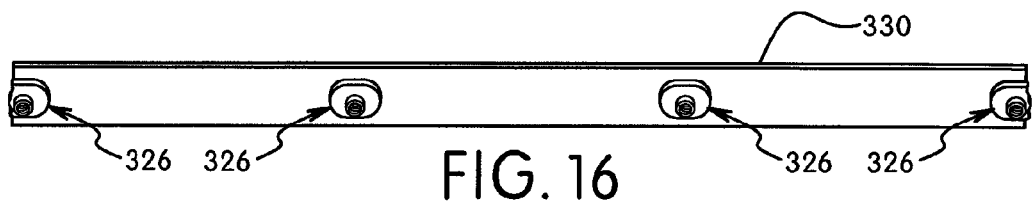
FIG. 16 is a partial perspective view of four of the spoke attachment members that are tether connected together by a tethering member in the form of a wide plate in accordance with a fourth embodiment.
Figure 17:
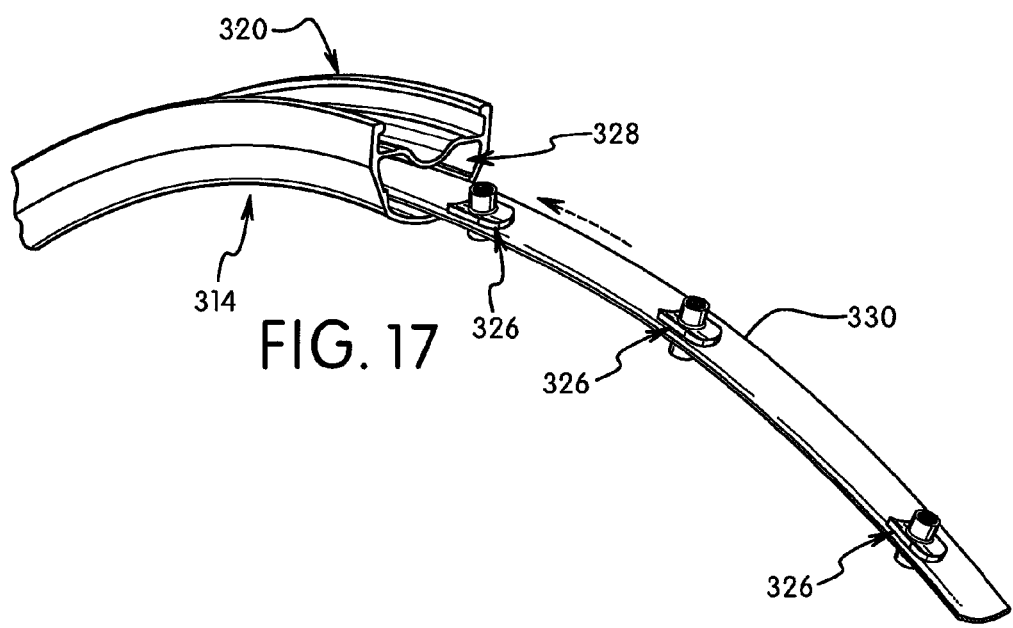
FIG. 17 is a perspective view of the spoke attachment members illustrated in FIG. 16 being inserted into the interior space of the rim.
Figure 18:
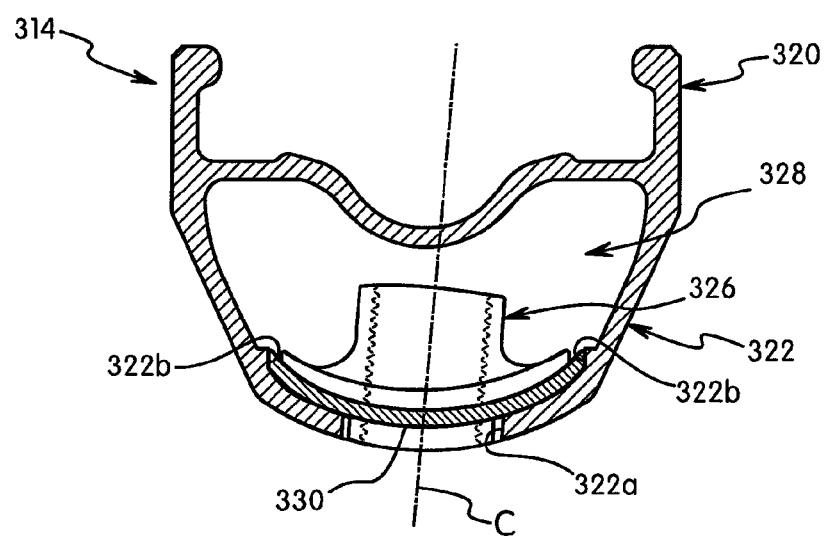
FIG. 18 is an enlarged transverse cross-sectional view of a portion of the bicycle rim as seen along a section line in at the center of one of the spoke openings of the rim after the spoke attachment members have been aligned and located in the spoke openings of the rim using the wide plate illustrated in FIGS. 16 and 17 as a tethering member.

Referring to now to FIGS. 16 to 18, a linked spoke attachment arrangement is illustrated for use with a modified rim 314 in accordance with a fourth illustrated embodiment. Here, the modified rim 314 includes an annular tire mounting part 320 and an annular spoke mounting part 322 including a plurality of spoke openings 322a. The modified rim 314 is identical to the rim 14 discussed above, except that the modified rim 314 includes a pair of circumferential recesses or grooves 322b for limiting lateral movement of the linked spoke attachment arrangement within an interior space 328 of the modified rim 314.

In this fourth embodiment, the linked spoke attachment arrangement includes a plurality of spoke attachment members 326 and a single tethering member 330. The spoke attachment members 326 are identical to the spoke attachment members 26 as discussed above except that the spoke attachment members 326 are tethered together by the tethering member 330 for alignment with the spoke openings 322a of the rim 314.

Preferably, in this fourth embodiment, the linked spoke attachment arrangement includes a predetermined number of the spoke attachment members 326 that corresponds to the number of the spoke openings 322a of the modified rim 314. In other words, the linked spoke attachment arrangement of this fourth embodiment, the tethering member 330 is a single one-piece member with twenty-four of the spoke attachment members 326 fixed thereto. However, two or more linked spoke attachment arrangements can be used with the modified rim 314 as explained in some of the other illustrated embodiment. For example, in this fourth embodiment, four linked spoke attachment arrangements, each having six of the spoke attachment members 326, can be used with the modified rim 314.

The tethering member 330 includes a resilient plate that is dimension relative to the interior space 328 of the modified rim 314 in a direction parallel to the center rotational axis of the modified rim 314 such that the lateral side edges of the plate contacts lateral side surfaces of the circumferential recesses 322b of the annular spoke mounting part 322 to limit lateral movement of the spoke attachment members 326 in the interior space 328. In other words, the lateral side surfaces of the circumferential recesses 322b contact the lateral side edges of the tethering member 330 (e.g., the resilient plate) for guiding both of the lateral side edges of the tethering member 330 (e.g., the resilient plate) during installation of the spoke attachment members 326 into the interior space 328 of the modified rim 314.

Preferably, the tethering member 330 is formed of a material that is self supporting such that the spoke attachment members 326 can be pushed circumferentially within the interior space 328 without the tethering member 330 collapsing. The tethering member 330 is a wide plate that is configured to prevent twisting (torsional movement) about its longitudinal dimension during installation. The tethering member 330 can be a normally flat plate with sufficient resiliency to elastically bend to form an arc that matches the curvature of the rim 314. Alternatively, the tethering member 330 can be a normally curved plate with a curvature that matches or substantially matches the curvature of the rim 314. In either case, the tethering member 330 preferably includes a resilient plate that at most elastically deforms (i.e., does not plastically deform) during installation of the linked spoke attachment arrangement into the interior space 328.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "circumferential", "radial", "axial", "width", "inner", "outer", and "transverse" as well as any other similar directional terms refer to those directions with respect to a center axis of rotation of the bicycle rim. The term "self supporting" as used herein to refer to the tethering members means a member that retains its shape when pushed along a flat horizontal surface. Finally, terms of degree such as "substantially", "about" and "approximately" as used herein mean a reasonable amount of deviation of the modified term such that the end result is not significantly changed, e.g., manufacturing tolerances.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
an annular tire mounting part;
an annular spoke mounting part including a plurality of spoke openings disposed at predetermined locations along a circumferential direction of the annular spoke mounting part with a predetermined circumferential spacing between adjacent centers of the spoke openings; and
a plurality of spoke attachment members being tethered together by at least one tethering member such that adjacent ones of the spoke attachment members are retained by the at least one tethering member with a predetermined maximum distance between adjacent ones of the spoke attachment members, the predetermined maximum distance corresponding to the predetermined circumferential spacing between the adjacent centers of the spoke openings, and the plurality of spoke attachment members being disposed in an internal space defined by at least the annular tire mounting part and the annular spoke mounting part.

2. The bicycle rim according to claim 1, wherein the predetermined maximum distances between the adjacent ones of the spoke attachment members are equal.

3. The bicycle rim according to claim 1, wherein the at least one tethering member includes a plurality of individual tethering members.

4. The bicycle rim according to claim 1, wherein the at least one tethering member is a single one-piece member with the spoke attachment members fixed thereto.

5. The bicycle rim according to claim 1, wherein the at least one tethering member is flexible, non-resilient and non-self supporting such that the at least one tethering member collapsibly interconnects the spoke attachment members in a circumferential direction within the interior space.

6. The bicycle rim according to claim 5, wherein the at least one tethering member includes a non-metallic cord.

7. The bicycle rim according to claim 1, wherein the at least one tethering member is self supporting such that the spoke attachment members move circumferentially together within the interior space without the at least one tethering member collapsing during installation of the spoke attachment members by pushing the at least one tethering member.

8. The bicycle rim according to claim 7, wherein
the at least one tethering member includes a resilient metallic wire.

9. The bicycle rim according to claim 7, wherein
the spoke mounting part extends from the annular tire mounting part to define an interior space with a predetermined interior shape; and
the at least one tethering member includes a resilient plate that has a narrower lateral width than a lateral width of the interior space in a direction parallel to a center rotational axis of the bicycle rim.

10. The bicycle rim according to claim 1, wherein
the spoke mounting part extends from the annular tire mounting part to define the interior space with a predetermined interior shape; and
the at least one tethering member includes a resilient plate that is dimensioned relative to the interior space in a direction parallel to a center rotational axis of the bicycle rim such that the lateral side edges of the plate contact lateral side surfaces of the annular spoke mounting part to limit lateral movement of the spoke attachment members in the interior space.

11. The bicycle rim according to claim 10, wherein
the interior space includes a pair of recesses for guiding both of the lateral side edges of the resilient plate.

12. A linked spoke attachment arrangement comprising:
a plurality of spoke attachment members, each of the spoke attachment members having a spoke receiving hole; and
at least one tethering member connecting the spoke attachment members together such that the spoke attachment members are retained by the at least one tethering member with predetermined maximum distances therebetween, the at least one tethering member being flexible, non-resilient and non-self supporting.

13. The bicycle rim according to claim 12, wherein
the at least one tethering member includes a plurality of individual tethering members.

14. The bicycle rim according to claim 12, wherein
the at least one tethering member is a single one-piece member with the spoke attachment members fixed thereto.

15. The linked spoke attachment arrangement according to claim 12, wherein
the at least one tethering member includes a non-metallic cord.

* * * * *